United States Patent [19]

Tikhonov et al.

[11] 4,348,279
[45] Sep. 7, 1982

[54] APPARATUS FOR CLEANING DRILLING MUD

[76] Inventors: Jury P. Tikhonov, Zaiton, 17; Stanislav A. Alekhin, Chilanzar, 24, dom 55, kv. 89; Vitold M. Bakhir, Gaidara, 7a, kv. 17; Jury G. Zadorozhny, Chilanzar, 2, dom 59, kv. 12, all of Tashkent, U.S.S.R.

[21] Appl. No.: 215,353

[22] Filed: Dec. 11, 1980

[51] Int. Cl.$^3$ .............................................. B01D 21/24
[52] U.S. Cl. .................................. 210/96.1; 210/113; 210/223; 210/243; 210/533; 209/496
[58] Field of Search ...................... 210/740, 96.1, 112, 210/113, 141, 143, 222, 223, 243, 533; 209/491, 494, 495, 496

[56] References Cited

U.S. PATENT DOCUMENTS

| | | | |
|---|---|---|---|
| 1,518,136 | 12/1924 | Dorr | 210/740 |
| 3,498,455 | 3/1970 | Kirby | 210/222 |
| 3,834,539 | 9/1974 | Thompson | 210/223 X |

FOREIGN PATENT DOCUMENTS

| | | | |
|---|---|---|---|
| 1102061 | 3/1961 | Fed. Rep. of Germany | 209/491 |
| 591413 | 2/1978 | U.S.S.R. | 210/113 |
| 640752 | 1/1979 | U.S.S.R. | 209/491 |

Primary Examiner—John Adee
Attorney, Agent, or Firm—McAulay, Fields, Fisher, Goldstein & Nissen

[57] ABSTRACT

An apparatus for cleaning drilling mud, wherein a straightflow hopper (1) has a pipe (2) for collecting drillings deposited from the drilling mud, accommodating a device (3) for removing the drillings. The device for removing the drillings comprises two shutters (4, 5) provided at the ends of the pipe (2) for collecting the drillings separated from the drilling mud, which are connected to one another and coupled to an actuator (8) for turning the shutters for alternately shutting-off the cross-section of the pipe (2).

3 Claims, 1 Drawing Figure

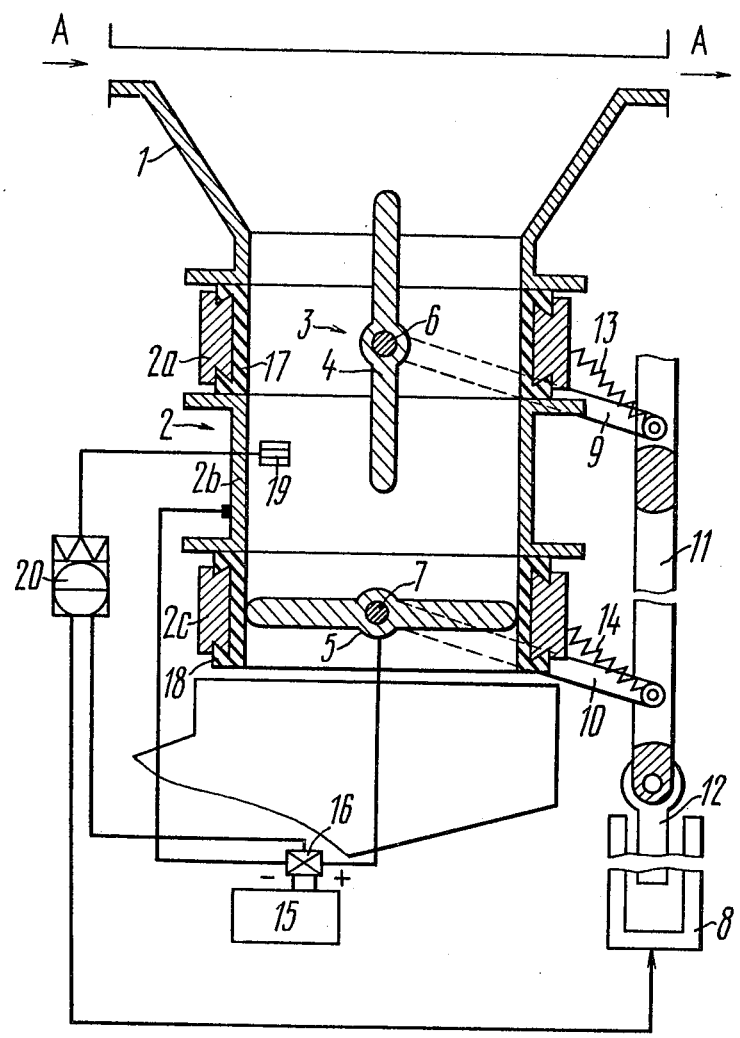

APPARATUS FOR CLEANING DRILLING MUD

TECHNICAL FIELD

The present invention relates to the drilling technology, and more particularly, to apparatus for cleaning drilling mud.

BACKGROUND OF THE INVENTION

Drilling mud is known to represent a heterogeneous liquid system necessarily containing colloidal solid phase particles. The presence of such particles in drilling mud determines a number of rheological properties of the drilling mud which are important from the point of view of well drilling quality. Drilling mud should retain these properties which enable the best well drilling conditions. The maintenance of properties of drilling mud during drilling is, however, a very difficult problem.

The majority of drilling operations are conducted in clayey rocks. The clayey rock being drilled is partly dispersed into highly colloidal particles admixed to the drilling mud so that after several cycles of pumping of the drilling mud through the well during drilling the composition of drilling mud is undesirably changed.

Restoration of drilling mud properties makes it necessary to use various methods for improving quality of drilling mud. Therefore, an efficient cleaning of drilling mud from drillings is of a predominant importance for the well drilling process.

Technological and economical performance of drilling largely depends on quality of drilling mud being used and the degree of its cleaning from drillings.

High-grade cleaning of drilling mud improves the mechanical drilling speed and the conditions for operation of drill bits and other equipment. In addition to an improvement of mechanical speed of drilling, high-grade cleaning of drilling mud contributes to a reduction of consumption of materials used for maintaining properties of drilling mud, prolonging its service life and reducing complications and emergency situations during drilling.

Low quality of cleaning of drilling mud is the main cause of emergency situations and complications associated with loss of drilling mud, jamming of drilling and casing pipes, avalanches and outbursts of rock from the well walls.

Therefore, high-grade cleaning of drilling mud from drillings is the most important production process during well drilling which substantially affects the technological and economical performance of well drilling.

All existing apparatus (vibratory screens, hydrocyclones) for cleaning drilling mud (cf., Driller's Handbook by V. I. Mischevich, vol. I, 1973, "Nedra" Publishers, Moscow, pp. 369–375) (in Russian) enable the elimination of a certain part of solid particles from drilling mud at various rates and degrees. Thus, the smallest size of particles that can be separated from drilling mud on vibratory screens depends on the mesh size of the screen. With a reduction of mesh size, to improve quality of cleaning, the throughput capacity materially decreases and drilling mud losses with the waste increase.

In cleaning in hydrocyclones heavy-weight particles are removed from drilling mud. Fine particles (less than 20 $\mu$m) appearing upon dispersion of drillings in drilling mud cannot be removed by hydrocyclones and other cleaning devices.

In addition, one of the most important problems in cleaning drilling mud in prior art apparatus is the problem of separation of drillings from drilling mud. Drillings are generally separated from drilling mud after the apparatus is stopped, and this is associated with large losses of drilling mud. This problem may be solved by cutting most compacted mass of the drillings off the main mass of drilling mud as the drillings are compacted. The most promising way of bringing a solution to this problem appears to be provided by an apparatus for cleaning drilling mud from drillings, comprising a straight-flow hopper having a discharge pipe and a device for removing drillings.

The device for removing drillings in a prior art apparatus comprises a conveyor screw and a valve cutting the interior of the hopper off the pipe (cf., USSR Inventor's Certificate No. 572279, cl. B01D, 21/00, issued in 1976).

The prior art apparatus enables the removal of drillings deposited in the pipe together with a part (up to 30%) of drilling mud, so that a substantial quantity of drilling mud is lost thus resulting in added cost.

DISCLOSURE OF THE INVENTION

The invention is based on the problem of providing an apparatus for cleaning drilling mud, wherein a device for removing drillings is so constructed as to reduce losses of drilling mud during removal of drillings.

This problem is solved by that there is provided an apparatus for cleaning drilling mud, wherein a straight-flow hopper is provided with a pipe for collecting drillings deposited from drilling mud which accommodates a device for removing drillings, wherein, according to the invention, the device, for removing drillings comprises two shutters arranged at the ends of the pipe for collecting drillings separated from drilling mud, the shutters being operatively connected to one another and coupled to an actuator for turning them so as to alternately shut-off the cross-section of the pipe.

The apparatus is preferably provided with a sensor for sensing the density of drillings which is installed in the pipe for collecting drillings separated from drilling mud in the zone between the shutters and coupled to the actuator for turning the shutters.

This facility ensures a timely removal of drillings from the apparatus when a pre-set density of drillings is achieved.

One of the shutters and the pipe for collecting drillings separated from drilling mud are preferably made of an electrically conducting material and connected, via a polarity reverse switch, to a d-c supply source, and a ring of an insulating material is preferably provided within the pipe in the zone of the shutter so as to electrically insulate the shutter from the pipe when the shutter is closed.

Connecting the shutter and pipe to a d-c supply source provides for isolation of colloidal particles from drilling mud, disruption of structure and more rapid deposition of drillings.

The apparatus according to the invention for cleaning drilling mud enables an efficient and high-grade removal of drillings practically without losses of drilling mud, while being comparatively simple in structure.

BEST MODE FOR CARRYING OUT THE INVENTION

A specific embodiment of the invention will now be described in detail with reference to the accompanying drawing schematically showing an apparatus for cleaning drilling mud according to the invention.

An apparatus for cleaning drilling mud comprises a straightflow hopper 1 through which flows drilling mud being cleaned as shown by arrows A. A pipe 2 for collecting drillings deposited from drilling mud is provided in the bottom portion of the hopper 1 and has a device 3 for removing drillings. The device 3 comprises two shutters 4 and 5 provided at the ends of the pipe 2 and installed on pivot pins 6 and 7, respectively.

The shutters 4 and 5 are operatively connected to one another and are coupled to an actuator 8 for alternately shutting-off the cross-section of the pipe 2. The operative connection comprises arms 9 and 10, each having one end connected to the respective shutter 4 or 5 and the other end connected to a rocker arm 11.

The actuator 8 in this embodiment is a solenoid having an anchor 12 connected to the rocker arm 11 for moving it in one direction (downward in the drawing). Springs 13 and 14 are provided for returning the rocker arm 11 back (upward in the drawing), each spring having one end secured to the pipe 2 and the other end secured to the respective arm 9 or 10.

The pipe 2 is made composite and consists of three interconnected parts 2a, 2b and 2c. The shutter 4 is installed in the zone of the part 2a, and the shutter 5 is installed in the zone of the part 2c. The shutter 5 and the part 2b of the pipe 2 are made of an electrically conducting material and are connected to a d-c supply source 15 via a polarity reverse switch 16.

To insulate the shutters 4 and 5 from the walls of the respective parts 2a and 2c of the pipe 2, rings made of an insulating material 17 and 18, respectively, are provided within these parts.

A sensor 19 for monitoring the density of drillings is provided in the pipe 2. The sensor is installed in the zone between the shutters 4 and 5. A strain gauge is used in this embodiment as the sensor sensing the density.

The output of the sensor is connected to an input of a controller 20 which controls the position of the shutters 4, 5. Outputs of the controller 20 are connected to inputs of the actuator 8 and to the polarity reverse switch 16.

The apparatus for cleaning drilling mud functions in the following manner.

Drilling mud being cleaned is fed from a circulation system to the straightflow hopper 1. Negatively charged clayey particles move in the electric field created in the pipe 2 between the shutters 4 and 5 toward the lower shutter 5 which shuts-off the pipe 2 and which is connected to the positive terminal of the d-c supply source.

As a result, the structure of drilling mud in the zone of deposition of drillings is disrupted, and drillings settle down in the pipe 2. When a pre-set density of drillings is achieved, the sensor 19 acts on the actuator 8 via the regulator 20 so as to cause the anchor 12 of the actuator to move together with the rocker arm 11 and arms 9 and 10 downward as shown in the drawing, and the shutter 4 closes the cross-section of the pipe 2 to shut the interior of the hopper 1 off the interior of the pipe 2. At the same time, a command is fed to the polarity reverse switch 16 to connect the shutter 5 to the negative terminal of the d-c supply source 15 and to connect the part 2b of the pipe 2 to the positive terminal of the supply source. The solid phase particles sticking to the shutter 5 are thus repelled from the shutter 5 by charges of the same polarity at the surface of the shutter 5 and are removed from the pipe 2.

After the drillings are removed from the pipe, the sensor 19 feeds a signal, via the controller 20, to the polarity reverse switch 16 and to the actuator 8 to return the shutters 4 and 5 back to the initial position.

In case the content of solid phase in drilling mud is low, the apparatus enables the cleaning of drilling mud without using auxiliary cleaning devices, such as vibratory screens and hydrocyclones. In case there is a high content of solid phase in drilling mud, the apparatus improves the efficiency of other cleaning devices and makes it possible to simplify their structure and reduce power requirements. This is achieved owing to the electrical treatment of drilling mud contributing to an intensification of separation of drillings from drilling mud.

Simple structure of the apparatus ensures its reliable operation.

Economical advantage of the apparatus according to the invention is ensured by more efficient cleaning and reduced losses of drilling mud with valuable components, elimination of equipment and operations associated with coarse cleaning of drilling mud, more effficient utilization of the existing equipment. The main advantage of the invention resides in an improved mechanical drilling speed owing to a better quality of cleaning of drilling mud.

Industrial Applicability

The present invention may be most advantageously used in drilling oil and gas production wells and geological prospecting boreholes. The invention may also be used in the chemical industry, in the manufacture of construction materials and in other industries where solid phase is to be separated from a slurry.

We claim:

1. An apparatus for cleaning drilling mud, wherein a straightflow hopper has a pipe for collecting drillings deposited, from drilling mud, which accommodates a device for removing drillings, characterized in that the device (3) for removing the drillings comprises two shutters (4, 5) provided at the ends of the pipe (2) for collecting the drillings deposited from driling mud, which are operatively connected to one another and coupled to an actuator (8) for turning them for alternately shutting-off the cross-section of the pipe (2).

2. An apparatus according to claim 1, characterized in that it is provided with a sensor (19) for sensing the degree of compaction of the drillings, which is installed in the pipe (2) for collecting the drillings in the zone between the shutters (4, 5) and coupled to the actuator (8) for turning the shutters.

3. An apparatus according to claim 1, characterized in that one (5) of the shutters and the pipe (2) for collecting the drillings are made of an electrically conducting material and are connected, via a polarity reverse switch (16), to a d-c supply source (15), and a ring (18) made of an insulating material is provided within the pipe (2) in the zone of the shutter to electrically insulate the shutter (5) from the pipe (2) when the shutter is closed.

* * * * *